(12) United States Patent
Miki et al.

(10) Patent No.: US 10,096,804 B2
(45) Date of Patent: Oct. 9, 2018

(54) BATTERY PACK

(71) Applicant: NISSAN MOTOR CO., LTD., Yokohama-Shi, Kanagawa (JP)

(72) Inventors: Sadao Miki, Kanagawa (JP); Kouji Iwashita, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 63 days.

(21) Appl. No.: 15/028,315

(22) PCT Filed: Sep. 29, 2014

(86) PCT No.: PCT/JP2014/075859
§ 371 (c)(1),
(2) Date: Apr. 8, 2016

(87) PCT Pub. No.: WO2015/053119
PCT Pub. Date: Apr. 16, 2015

(65) Prior Publication Data
US 2016/0248058 A1    Aug. 25, 2016

(30) Foreign Application Priority Data
Oct. 8, 2013  (JP) ................................ 2013-210704

(51) Int. Cl.
*H01M 2/10*  (2006.01)
*H01M 2/12*  (2006.01)
(Continued)

(52) U.S. Cl.
CPC ....... *H01M 2/1016* (2013.01); *H01M 2/0245* (2013.01); *H01M 2/1077* (2013.01);
(Continued)

(58) Field of Classification Search
CPC ......... H01M 10/0525; H01M 10/0585; H01M 2220/20; H01M 2/0245; H01M 2/1016; H01M 2/1077; H01M 2/1252
See application file for complete search history.

(56) References Cited

U.S. PATENT DOCUMENTS 2,416,576 A * 2/1947 Franz ...................... H01M 6/46
429/155
2008/0057384 A1* 3/2008 Jang ...................... H01M 2/021
429/129
(Continued)

FOREIGN PATENT DOCUMENTS

JP      2001084974      3/2001
JP      2011-023268 A   2/2011
(Continued)

*Primary Examiner* — Lingwen R Zeng
(74) *Attorney, Agent, or Firm* — Young Basile Hanlon & MacFarlane, P.C.

(57) ABSTRACT

A battery including plural unit cells stacked on top of each other in the up-and-down direction is accommodated in a case to constitute each battery module. The plural battery modules are stacked on top of each other in the up-and-down direction to constitute a battery module stack. The case includes a lower case and an upper case. A sidewall portion of the lower case is situated outside of a sidewall portion of the upper case, and an upper end of the sidewall portion is situated above a lower end of the sidewall portion. Between the sidewall portion of the lower case and the sidewall portion of the upper case, a communicating portion to discharge high-temperature gas generated within the case to the outside is formed.

4 Claims, 8 Drawing Sheets

(51) Int. Cl.
*H01M 10/0525* (2010.01)
*H01M 10/0585* (2010.01)
*H01M 2/02* (2006.01)

(52) U.S. Cl.
CPC ..... *H01M 2/1252* (2013.01); *H01M 10/0525* (2013.01); *H01M 10/0585* (2013.01); *H01M 2220/20* (2013.01)

(56) References Cited

U.S. PATENT DOCUMENTS

2012/0148887 A1* 6/2012 Thaler ................. H01M 2/1072
429/72
2012/0301763 A1 11/2012 Tonomura et al.

FOREIGN PATENT DOCUMENTS

| JP | 2011-181346 A | 9/2011 |
| JP | 2012084247 A | 4/2012 |
| JP | 2013-012458 A | 1/2013 |
| JP | 2013-186995 A | 9/2013 |

* cited by examiner

BATTERY PACK

CROSS REFERENCE TO RELATED APPLICATION

The present application is based on Japanese Patent Application No. 2013-210704 filed on Oct. 8, 2013, the entire content of which is herein incorporated by reference.

TECHNICAL FIELD

The present invention relates to a battery pack including plural battery modules assembled, each battery module including a battery accommodated in a case.

BACKGROUND

As a battery pack including plural battery modules assembled, each battery module including a battery accommodated in a case, Japanese Patent Application Publication No. 2013-12458 below discloses a battery pack in which plural battery modules are stacked on top of each other in the up and down direction.

When gas is emitted from a battery which is accommodated in a case of a battery module situated in lower part because of battery abnormalities, heat of the gas emitted from the battery situated in the lower part influences batteries of the other battery modules located in upper part and could shorten the lives of the batteries.

If gas is emitted from one of the batteries because of battery abnormalities, the emitted gas needs to be properly exhausted to the outside of the case.

SUMMARY

Accordingly, an object of the present invention is to provide a battery pack in which heat of gas emitted from an abnormal battery in a certain battery module is prevented from influencing the battery of another battery module.

In a battery module of the present invention, a battery is accommodated in a case including a lower case covering lower part of the battery and an upper case covering upper part thereof. A battery pack according to the present invention includes a plurality of the battery modules assembled. The lower case includes a bottom wall portion situated under the battery and a sidewall portion extending upward from the outer limit of the bottom wall portion. The upper case includes a top wall portion situated over the battery and a sidewall portion extending downward from the outer limit of the top wall portion. The sidewall portion of the lower case is situated on the outside of the sidewall portion of the upper case, which is the opposite side of the sidewall portion of the upper case from the accommodation space, and is spaced from the sidewall portion of the upper case, and the upper end of the sidewall portion of the lower case is situated above the lower end of the sidewall portion of the upper case. Between the sidewall portions of the lower and upper cases, a communicating portion enabling communication between the accommodation space and the outside of the case is thereby provided.

BRIEF DESCRIPTION OF THE DRAWINGS

DETAILED DESCRIPTION OF THE EMBODIMENTS (First Embodiment) FIG. 1 is a simplified cross-sectional view of a battery pack 31, which includes plural (four in FIG. 1) battery modules 1 according to a first embodiment of the present invention. The battery modules 1 are stacked on top of each other in the up and down direction (in the vertical direction). Each of the battery modules 1 has a rectangular shape in plan view and is a flat cuboid as a whole.

Figure 2:
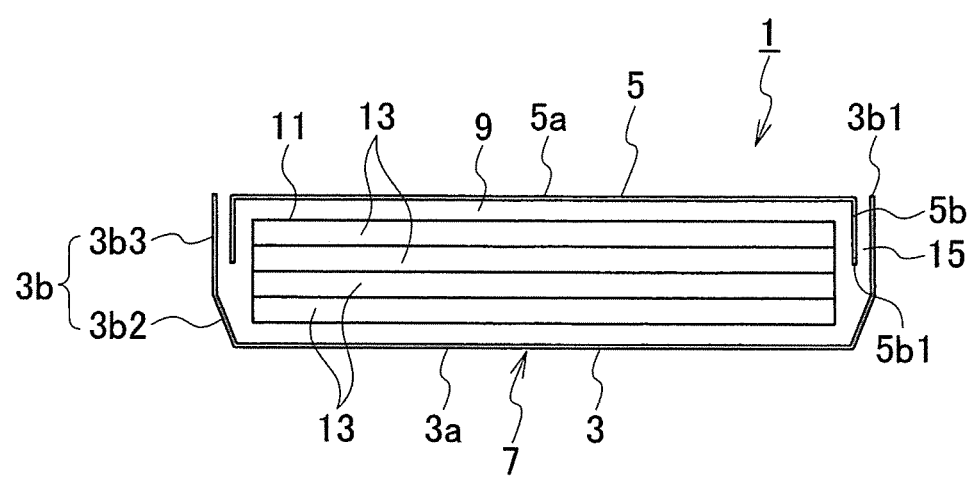
FIG. 2 is a cross-sectional view of one of the battery modules constituting the battery module stack of FIG. 1.

In each of the battery modules 1, a battery 11 is accommodated in an accommodation space 9 of a case 7 including a lower case 3 and an upper case 5 as illustrated in FIG. 2. In other words, the battery module 1 includes the case 7 and battery 11, and the case 7 is composed of the lower and upper cases 3 and 5. The lower case 3 covers lower part of the battery 11, and the upper case 5 covers upper part of the battery 11.

The battery 11 includes plural (four in FIG. 2) unit cells 13 stacked on top of each other. The plural unit cells 13 are electrically connected in series or in parallel. The unit cells 13 are used as a secondary battery for vehicles like lithium ion secondary batteries, for example.

Each of the unit cells 13 is a so-called laminate battery, for example. Each unit cell 13 includes a power generating element accommodated in a bag-shaped package together with an electrolyte. The power generating element includes positive and negative plates (electrode plates) which are stacked with a separator interposed therebetween.

The positive plate includes a collector made of aluminum foil, for example, and cathode active material layers formed on both surfaces of the collector. Each cathode active material layer includes a cathode active material composed of a lithium-transition metal composite oxide such as $LiMn_2O_4$, for example, a conductive agent, a binder, and the like.

The negative plate includes a collector made of copper foil, for example, and anode active material layers formed on both surfaces of the collector. Each anode active material layers includes an anode active material, a conductive agent, a binder, and the like. Examples of the anode active material are hard carbon (non-graphitizable carbon materials), graphite carbon materials, and lithium-transition metal composite oxides.

Each separator is made of polyolefin such as polyethylene or polypropylene, polyamide, or polyimide, for example.

The electrolyte (electrolytic solution) contains an organic solvent, a supporting electrolyte, and the like. Examples of the organic solvent are cyclic carbonates such as propylene carbonate (PC) and ethylene carbonate (EC), chain carbonates such as dimethyl carbonate, and ethers such as tetrahydrofuran. The supporting salt is an inorganic acid anionic salt such as lithium salt ($LiPF_6$) or an organic acid anionic salt such as $LiCF_3SO_3$.

The package is made of laminate film including a metallic layer and polymer resin layers formed on both surfaces of the metallic layer, for example. The metallic layer is composed of metallic foil made of aluminum, stainless, nickel, copper, or the like, for example. The polymer resin layers are composed of thermally fused resin film made of polyethylene, polypropylene, modified polyethylene, modified polypropylene, ionomer, ethylene vinyl acetate, or the like. The package is formed into a bag by laying two sheets of laminate film described above on top of each other and welding the outer edges thereof. The package may be also formed into a bag by folding a sheet of laminate film and welding the outer edge thereof.

When an abnormality, such as a short-circuit, occurs in any one of the unit cells 13, gas could be generated within the package and increase the internal pressure of the package. The welded edges of the sheets of laminate film laid on each other are thereby separated, and the gas within the package is emitted to the outside.

The lower case 3 of the case 7 includes a bottom wall portion 3a located in lower part of the battery 11 and sidewall portions 3b extending upward from the outer limit of the bottom wall portion 3a. On the other hand, the upper case 5 includes a top wall portion 5a located in upper part of the battery 11 and sidewall portions 5b extending downward from the outer limit of the top wall portion 5a.

One of the sidewall portions 3b of the lower case 3 is located outside of the corresponding sidewall portion 5b of the upper case 5. To be specific, the sidewall portion 3b is situated outside of the corresponding sidewall portion 5b (on the opposite side of the sidewall portion 5b from the accommodation space 9) and is spaced from the sidewall portion 5b. Moreover, an upper end 3b1 of the sidewall portion 3b is located above a lower end 5b1 of the corresponding sidewall portion 5b of the upper case 5. In other words, part of the sidewall portion 3b of the lower case 3 overlaps part of the sidewall portion 5b of the upper case 5 in the horizontal direction (in the in-plane direction of the battery 11). Between the sidewall portion 3b and sidewall portion 5b, a communicating portion 15 is formed, which enables the accommodation space 9 within the case 7 to communicate with the outside of the case 7. In other words, the sidewall portions 3b and 5b are spaced from each other to form the communicating portions 15, through which the accommodation space 9 within the case 7 communicates with the outside of the case 7.

One of the sidewall portions 3b of the lower case 3 includes an inclined portion 3b2 in lower part and a vertical portion 3b3 in upper part. To be specific, the inclined portion 3b2 extends diagonally upward and outward from the outer limit of the bottom wall portion 3a, and the upper end of the inclined portion 3b2 continues to the vertical portion 3b3. The vertical portion 3b3 vertically extends upward from the upper end of the inclined portion 3b2. The above-described communicating portion 15 is formed between an upper part of the vertical portion 3b3 and the corresponding sidewall portion 5b of the upper case 5.

Figure 3:
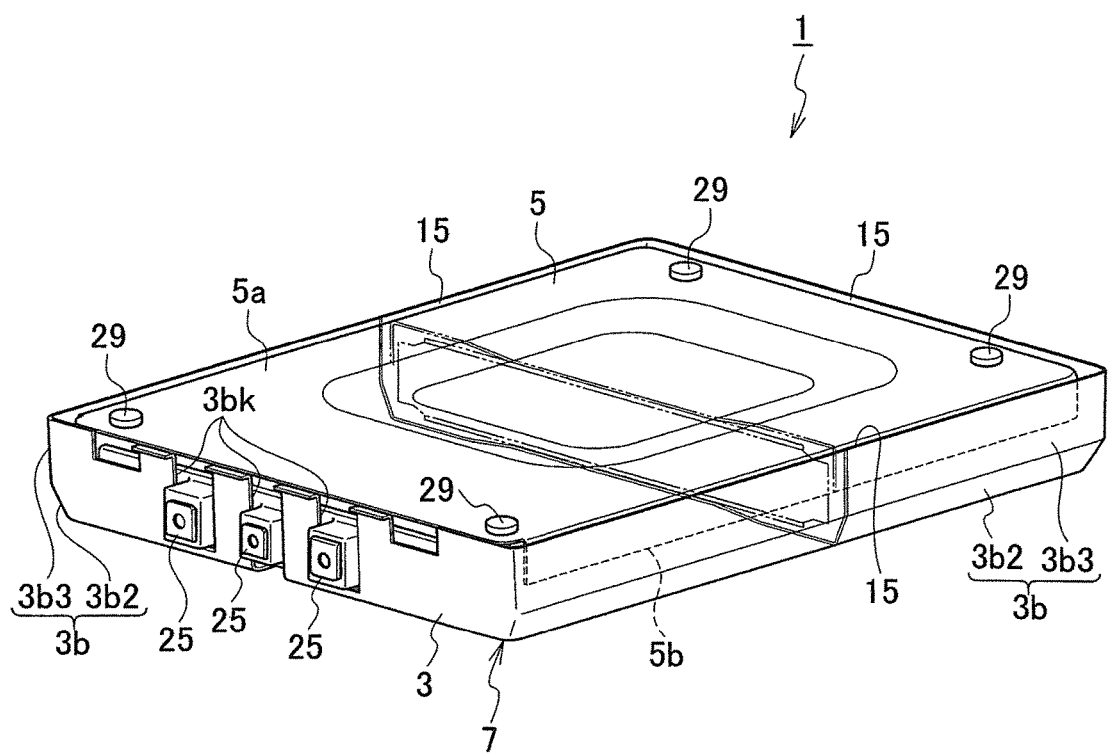
FIG. 3 is a perspective view illustrating a specific example of the battery module.
Figure 4:
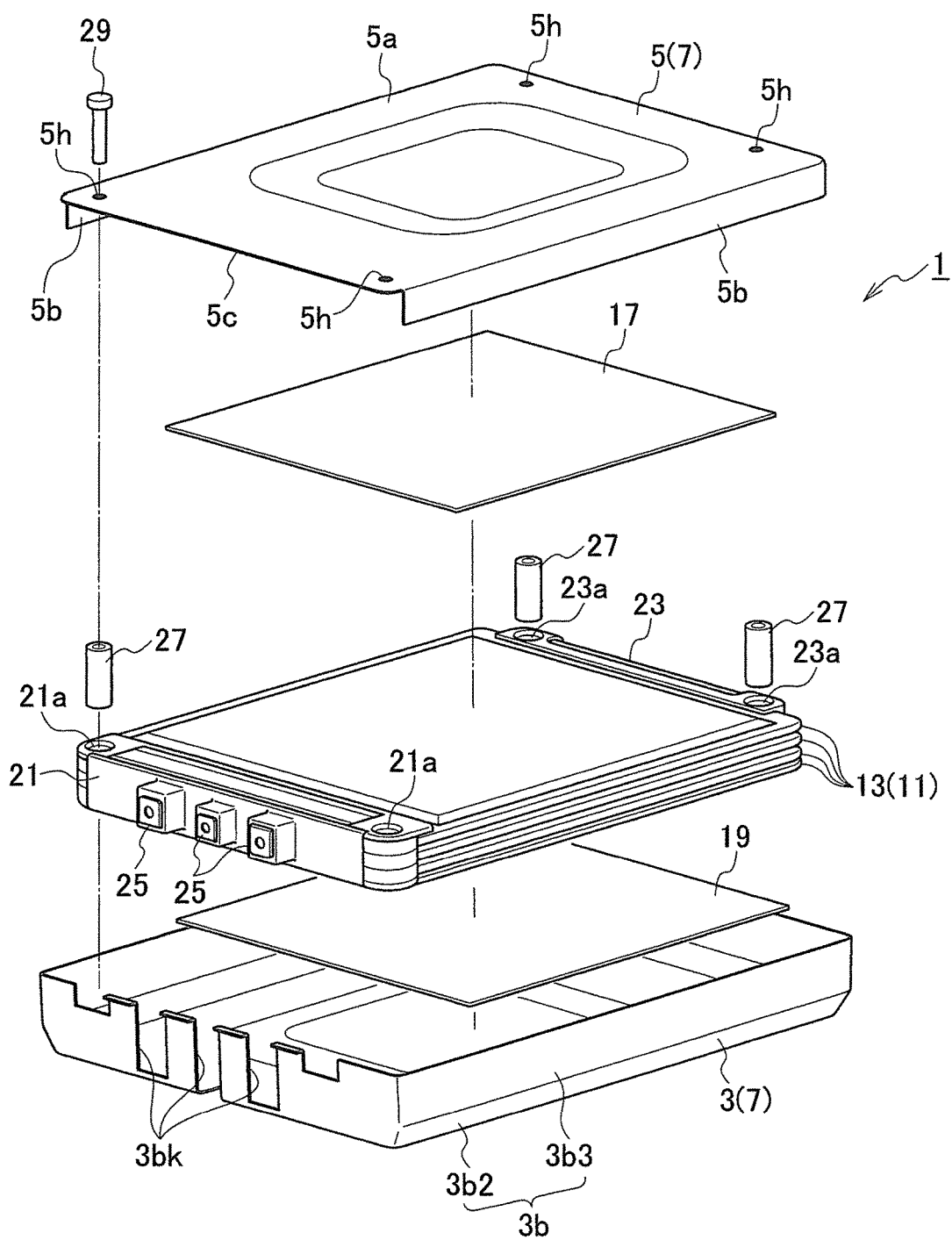
FIG. 4 is an exploded perspective view of the battery module of FIG. 3.

In the regions corresponding to two of the other three sides of the rectangular case 7 in a plan view, the sidewall portions 3b of the lower case 3 and the corresponding sidewall portions 5b of the upper case 5 are in the same positional relationship to form the same communicating portions 15 as described above. The region corresponding to the remaining side is not provided with any communicating portion 15 as a region provided with later-described terminal portions 25 of the battery 11 (see FIG. 3). In other words, as illustrated in FIGS. 3 and 4, in the region corresponding to the side provided with the terminal portions 25, the upper case 5 does not includes any sidewall portion 5b, and the upper end of the inner surface of the sidewall portion 3b of the lower case 3, which has a planar shape extending in the vertical direction, is in contact with an edge 5c of the upper case 5. The sidewall portion 3b of the lower case 3 is provided with openings 3bk allowing the terminal portions 25 to be exposed to the outside.

Next, a description is given of the specific shape and internal structure of the battery module 1 with reference to FIG. 4. As illustrated in FIG. 4, the battery 11, which is composed of the plural unit cells 13 laid on top of each other, is accommodated in the case 7 with insulating sheets 17 and 19 provided on the upper and lower sides of the battery 11. The insulating sheets 17 and 19 are made of resin such as PP.

The battery 11 includes holder members 21 and 23 configured to fix and hold the plural unit cells 13. The holder members 21 and 23 are situated at both ends corresponding to two sides opposite to each other. The holder member 21 is provided with the terminal portions 25 described above.

At both ends of each of the holder members 21 and 23, through holes 21a and 23a, which penetrate in the up and down direction, are formed, respectively. In each of the through holes 21a and 23a, a cylindrical sleeve 27 is inserted. The length of the sleeves 27 in the axial direction (in the height direction) is substantially equal to the thickness of the holder members 21 and 23. The upper case 5 is provided with bolt insertion holes 5h at the positions corresponding to the respective sleeves 27. In the lower case 3, not-illustrated nuts are attached to the positions corresponding to the respective sleeves 27.

Figure 5:
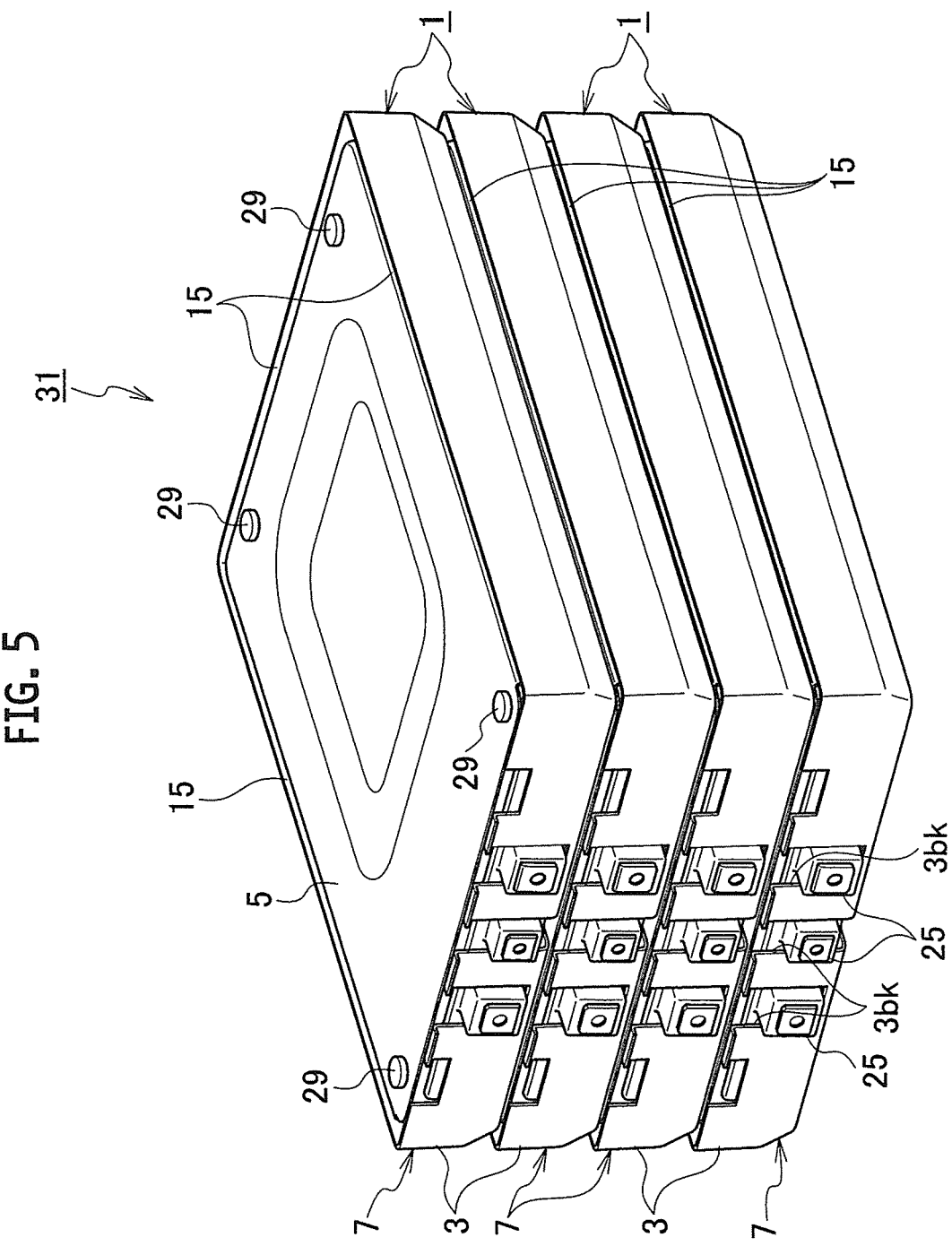
FIG. 5 is a perspective view of a battery module stack composed of a plurality of battery modules of FIG. 3 stacked on top of each other.

Bolts 29 are inserted into the bolt insertion holes 5h of the upper case 5 and the sleeves 27 and are fastened to the not-illustrated nuts of the lower case 3. The battery module 1 is thus completed. A plurality of the battery modules 1 are prepared and stacked on top of each other in the up and down direction as illustrated in FIG. 5. The stacked battery modules 1 are fixed to form the battery module stack 31 as a battery pack.

In each battery module 1, the lower ends of the sleeves 27 abut on the upper surface of the bottom wall portion 3a of the lower case 3 together with the lower surfaces of the holder members 21 and 23, and the upper ends of the sleeves 27 abut on the lower surface of the top wall portion 5a of the upper case 5 together with the upper surfaces of the holder members 21 and 23. By the length of the sleeves 27 in the axial direction, or the thickness of the holder members 21 and 23, the accommodation space 9 is formed between the lower and upper cases 3 and 5.

To stack and fix the plural battery modules 1 as illustrated in FIG. 5, the battery module stack 31 may be accommodated and fixed in a battery pack case not illustrated or may be fixed separately using a fixing device. Moreover, the bolts 29 may be configured to have a length equal to the stacking thickness of the battery module stack 31. The plural battery modules 1 are fastened and fixed together with the bolts and nuts.

Figure 6:
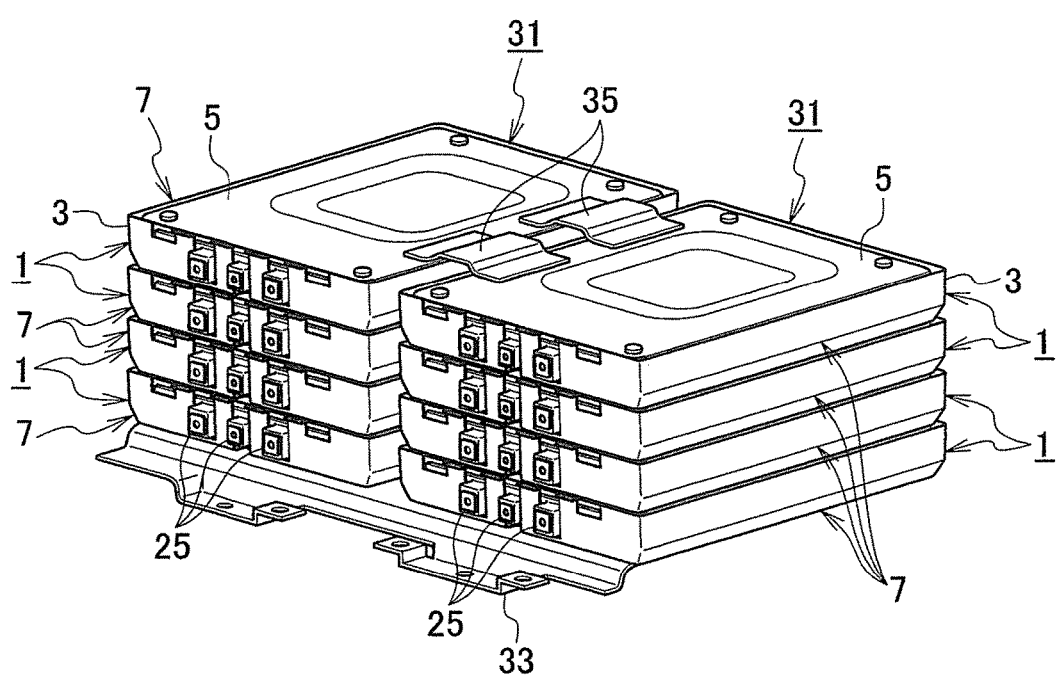
FIG. 6 is a perspective view illustrating a plurality of battery module stacks of FIG. 5 arranged side by side.

As illustrated in FIG. 6, a plurality of the battery module stacks 31 illustrated in FIG. 5 may be prepared and arranged side by side. In this case, the plural battery module stacks 31 are placed on a base plate 33 to be fixed, and upper portions of the battery module stacks 31 adjacent to each other are fixed with fixing members 35.

Next, the operation is described.

Figure 1:
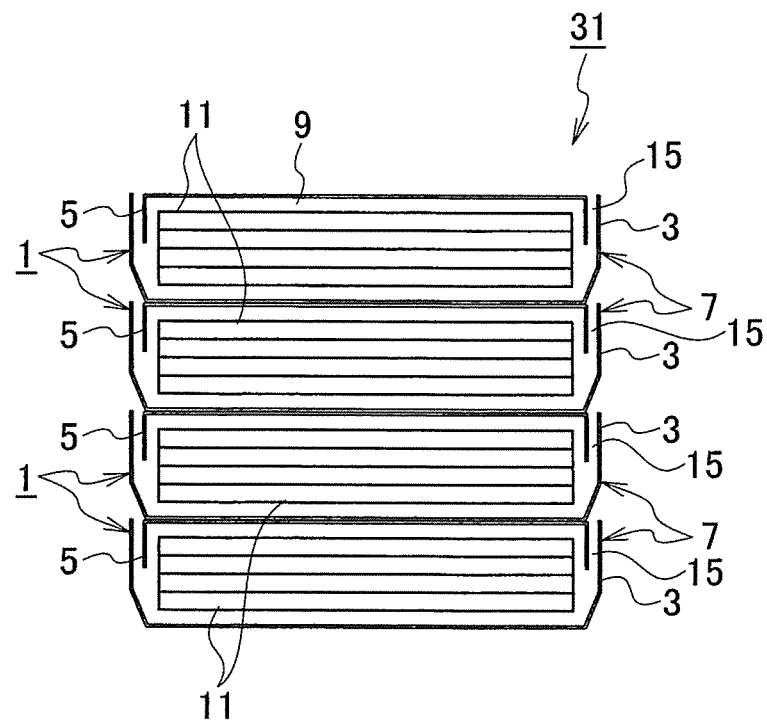
FIG. 1 is a cross-sectional view of a battery module stack (a battery pack) including plural battery modules stacked on top of each other according to a first embodiment of the present invention.
Figure 7:
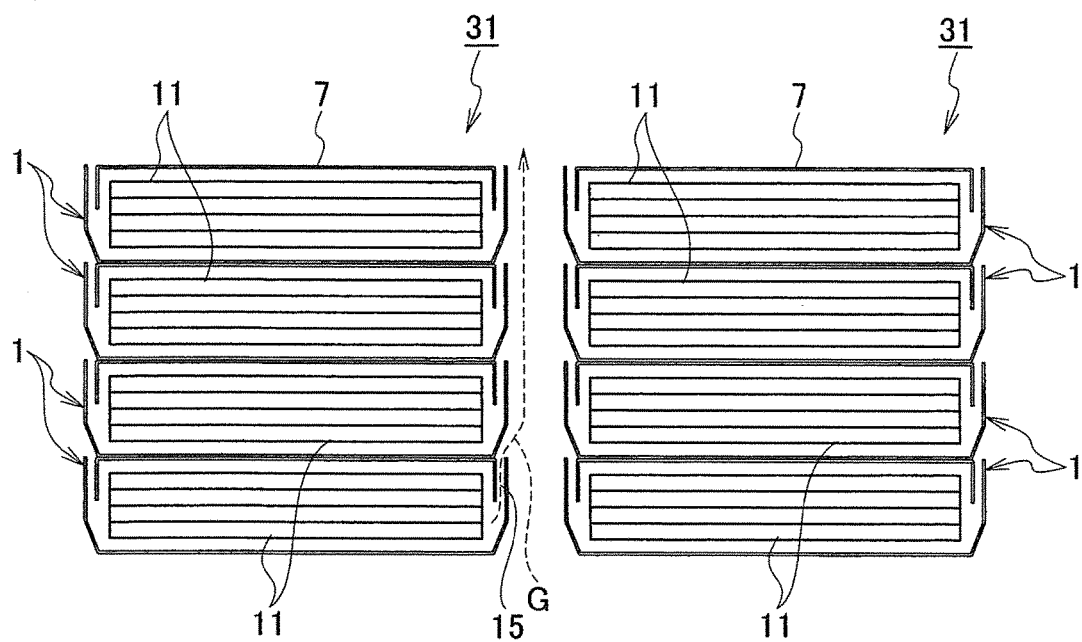
FIG. 7 is an operation explanatory view illustrating a flow of high-temperature gas which is emitted from a battery in the battery module situated at the bottom of one of the battery module stacks.

First, as illustrated in FIG. 1, the battery module stack 31 (battery pack) according to the first embodiment is composed of the plural battery modules 1 assembled. Accordingly, even when the battery 11 within one of the battery modules 1 generates high-temperature gas G due to abnormalities in the battery as illustrated in FIG. 7, heat of the gas G is prevented from influencing the batteries 11 within the other battery modules 1.

The battery module stack 31 (battery pack) is composed of plural battery modules 1 stacked in the up and down direction as illustrated in FIG. 1. Herein, it is assumed that there is an abnormality in the battery 11 of the battery module 1 located at the bottom, for example, and high-temperature gas G is generated from the abnormal battery 11 as illustrated in FIG. 7. In FIG. 7, two battery module stacks 31 are situated side by side as illustrated in FIG. 6.

According to the first embodiment, the communicating portions 15, which enable communication between the accommodation space 9 within the case 7 and the outside of the case 7, are provided between the sidewall portions 3b of the lower case 3 and the corresponding sidewall portions 5b of the upper case 5. The high-temperature gas G generated from the battery 11 at the bottom is discharged to the outside of the case 7 through the communicating portions 15. In the region provided with the terminal portions 25 illustrated in FIG. 4, the high-temperature gas G is discharged mainly through upper space of the openings 3bk above the terminal portions 25 and the amount thereof is very small. The upper space of the opening portions 3bk above the terminal portions 25 may be sealed by a sealing member. This can further reduce the discharge of the high-temperature gas G to the outside.

The high-temperature gas G discharged through the communicating portions 15 to the outside of the case 7 rises along the outer wall of the corresponding battery module stack 31. In the first embodiment, the upper ends 3b1 of the sidewall portions 3b of the lower case 3 are located above the corresponding lower ends 5b1 of the sidewall portions 5b of the upper case 5, and the sidewall portions 3b of the lower case 3 are situated outside of the corresponding sidewall portions 5b of the upper case 5 (in the opposite side of the sidewall portions 5b from the accommodation space 9) so as to be spaced from the respective sidewall portions 5b.

Accordingly, in the process where high-temperature gas G flows along the outer wall of the battery module stack 31, the high-temperature gas G mainly flows along the sidewall portions 3b of the lower case 3 as illustrated in FIG. 7. In each battery modules 1 located above the abnormal battery module 1, heat of the high-temperature gas G is less likely to be transmitted to the sidewall portion 5b of the upper case 5, and moreover the high-temperature gas G is less likely to enter the accommodation space 9 of the case 7 through the communicating portion 15. Accordingly, the battery modules 1 located above the abnormal battery module 1 are less likely to be influenced by heat of the high-temperature gas G, so that degradation of the batteries 11 are prevented.

Also in the other battery module stack 31 arranged adjacent to the battery module stack 31 including the abnormal battery module 1, heat of the generated high-temperature gas G is less likely to be transmitted to the sidewall portions 5b of the upper case 5. Moreover, in the other battery module stack 31 arranged adjacent thereto, the high-temperature gas G is less likely to enter the case 7 through the communicating portions 15. Accordingly, even when the battery module stacks 31 are placed side by side in the lateral direction (in the horizontal direction), each battery module 1 is less influenced by high-temperature gas G from the battery modules 1 adjacent thereto in the lateral direction (in the horizontal direction).

In the lower part of the sidewall portions 3b of the lower case 3, the inclined portions 3b2 extend upward and outward to be widened. Accordingly, high-temperature gas G generated within the case 7 is guided by the inclined portions 3b2 to easily flow to the communicating portions 15 between the sidewall portions 3b of the lower case 3 and the sidewall portions 5b of the upper case 5, thus further ensuring the discharge of high-temperature gas G to the outside of the case 7.

Each inclined portion 3b2 described above has a planar shape but may be curved and protruded outward so that the inner surface has a profile concave upward. When each inclined portion 3b2 has a curved face so that the inner surface is concave outward, high-temperature gas G flows to the communicating portions 15 more easily.

Figure 8:
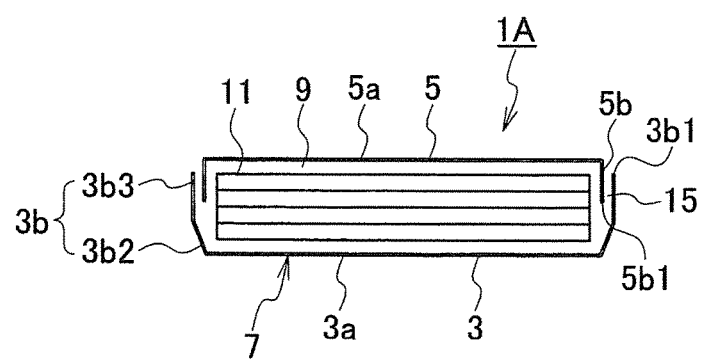
FIG. 8 is a cross-sectional view of a battery module having the same shape as that of FIG. 2 excepting that the side wall of the lower case is shorter in the up and down direction.

In the example illustrated in FIGS. 1 and 2, the upper ends 3b1 of the sidewall portions 3b of the lower case 3 are located at the substantially same position in the up and down direction as the top wall portion 5a of the upper case 5. On the other hand, the upper ends 3b1 of the sidewall portions 3b may be situated below the top wall portion 5a of the upper case 5 like a battery module 1A illustrated in FIG. 8 if the upper ends 3b1 of the sidewall portions 3b are situated above the lower ends 5b1 of the sidewall portions 5b of the upper case 5. However, the high-temperature gas G generated from one of the battery modules 1 can be more definitely prevented from entering the cases 7 of the battery modules 1 located above the battery module 1 emitting the high-temperature gas G when the upper ends 3b1 of the sidewall portions 3b are extended higher as illustrated in FIGS. 1 and 2 than those in FIG. 8.

Figure 9:
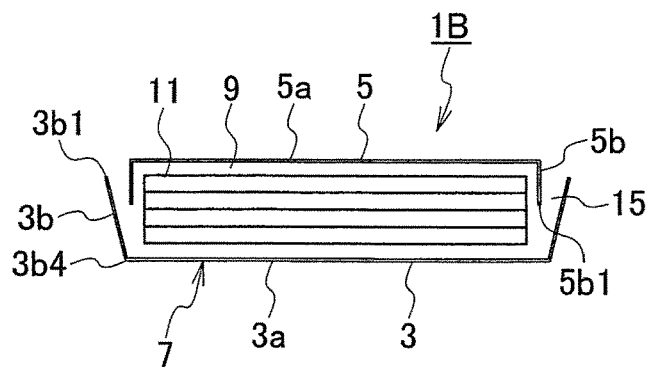
FIG. 9 is a cross-sectional view of a battery module according to a second embodiment of the present invention, in which the sidewall of the lower case is inclined.

(Second Embodiment) FIG. 9 illustrates a battery module 1B according to a second embodiment of the present invention. In the battery module 1B, each sidewall portion 3b of the lower case 3 is inclined so that upper part thereof is situated farther outward from the accommodation space 9 than lower part thereof. To be specific, each sidewall portion 3b of the lower case 3 is separated from the corresponding sidewall portion 5b of the upper case 5 in the horizontal direction so that the upper end 3b1 is situated farther outward from the sidewall portion 5b than a lower end 3b4, which connects to the bottom wall 3a of the lower case 3. The sidewall portions 3b extend upward from the lower end 3b4 and incline so as to be widened outward. In this case, the channel cross-sectional area of the communicating portion 14 between each sidewall portion 3b of the lower case 3 and the corresponding sidewall portion 5b of the upper case 5 gradually increases from the lower part toward the upper part.

As described above, in the battery module 1B of the second embodiment, the sidewall portions 3b of the lower case 3 incline so that the upper ends 3b1 as the upper part are situated outside of the corresponding lower ends 3b4 as the lower part with respect to the accommodation space 9, and the channel cross-sectional area of the communicating portions 15 increases toward the upper part. Accordingly, high-temperature gas G generated from the battery 11 within the battery module 1B can be more surely emitted out of the case 7 along the inclined sidewall portions 3b. In another battery module 1B situated above the abnormal battery module 1, heat of the high-temperature gas G is less likely to be transmitted to the sidewall portions 5b of the upper case 5. Accordingly, it is therefore possible to prevent degradation of the batteries 11 within the battery modules 1B more definitely. Each sidewall portion 3b in FIG. 9 has a planar shape but may have a curved face with the inner surface being concave upward.

Figure 10:
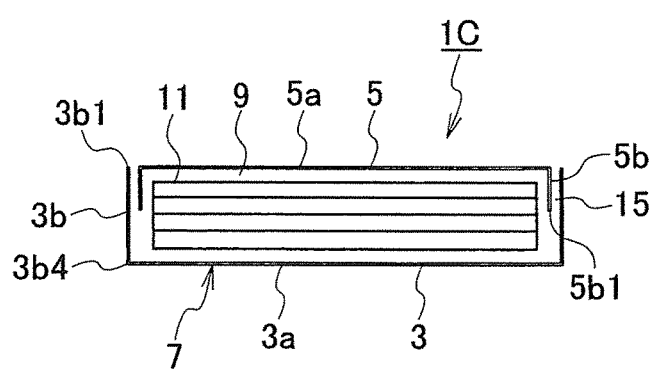
FIG. 10 is a cross-sectional view of a battery module in which the sidewall of the lower case has a planar shape extending in the vertical direction.
Figure 11:
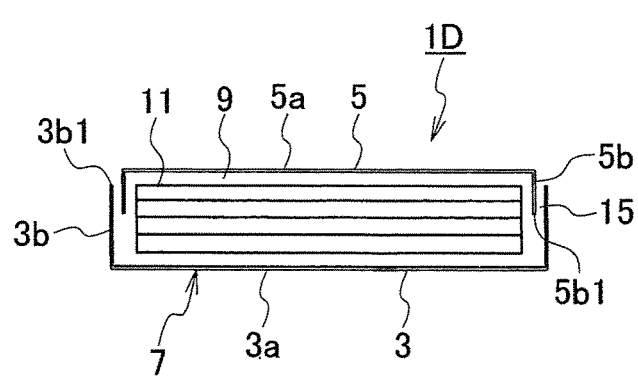
FIG. 11 is a cross-sectional view of a battery module having the same shape as that of FIG. 10 excepting that the side wall of the lower case is shorter in the up and down direction.
Figure 12:
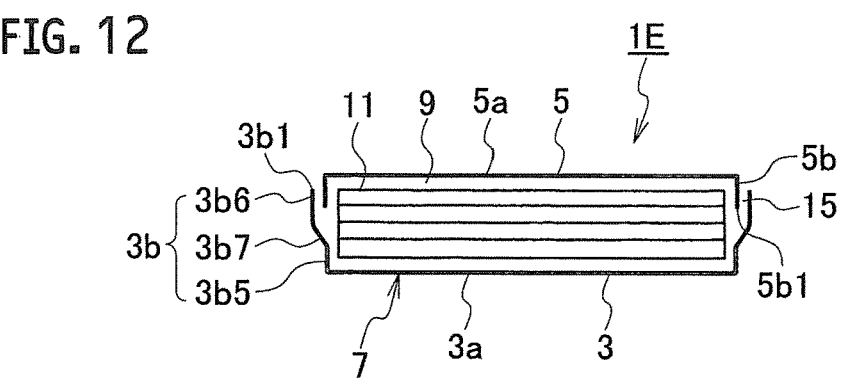
FIG. 12 is a cross-sectional view of a battery module in which the sidewall of the lower case includes a lower vertical portion and an upper vertical portion.

Moreover, each sidewall portion 3b of the lower case 3 may be shaped as illustrated in battery modules 1C to 1E of FIGS. 10 to 12. In the battery modules 1C and 1D of FIGS. 10 and 11, the sidewall portions 3b of the lower case 3 have a planer shape extending in the vertical direction. In FIG. 10, the upper ends 3b1 of the sidewall portions 3b are situated at the substantially same position in the up and down direction as the top wall portion 5a of the upper case 5a. In FIG. 11, upper ends 3b1 of the sidewall portions 3b are situated between the top wall portion 5a of the upper case 5 and the corresponding lower end 5b1 of the sidewall portion 5b.

In the example of FIG. 10, the overlapping area between each sidewall portion 3b of the lower case 3 and the corresponding sidewall portion 5b of the upper case 5 in the horizontal direction is larger than that in the example of FIG. 11. Accordingly, the effect of preventing heat of the high-temperature gas G from being transmitted to the sidewall portions 5b of the upper case 5 and the effect of preventing the high-temperature gas G from entering the case 7 are higher in the example of FIG. 10 than in the example of FIG. 11.

In the battery module 1E illustrated in FIG. 12, each sidewall portion 3b of the lower case 3 includes a lower vertical portion 3b5 situated in lower part, an upper vertical portion 3b6 situated in upper part, and an inclined portion 3b7 situated between the vertical portions 3b5 and 3b6. The upper vertical portion 3b6 is situated outside of the lower vertical portion 3b5 and partially overlaps the corresponding sidewall portion 5b of the upper case 5 in the horizontal direction. To be specific, the sidewall portion 3b is integrally composed of the lower vertical portion 3b5, which is provided in the lower side and vertically extended, the inclined portion 3b7, which is extended upward and outward from the upper end of the lower vertical portion 3b5, and the upper vertical portion 3b6, which is extended in the vertical direction from the upper end of the inclined portion 3b7. The inclined portion 3b7 may have a shape curved and protruded outward so that the inner surface thereof is concave upward, instead of the planer shape thereof.

In the example of the battery module 1E of FIG. 12, the high-temperature gas G generated within the case 7 can be easily emitted to the outside along the inclined portion 3b7 or the curved surface replaced for the inclined portion 3b7.

Hereinabove, the embodiments of the present invention is described. However, these embodiments are just examples illustrated for easy understanding of the present invention, and the present invention is not limited to these embodiments. The technical scope of the present invention includes not only the specific technical matters disclosed in the embodiments but also various modifications, changes, and alternative techniques easily derived from the embodiments.

The sidewall portions 3b of the lower case 3 may have various shapes in addition to the examples described above, for example.

Figure 13:
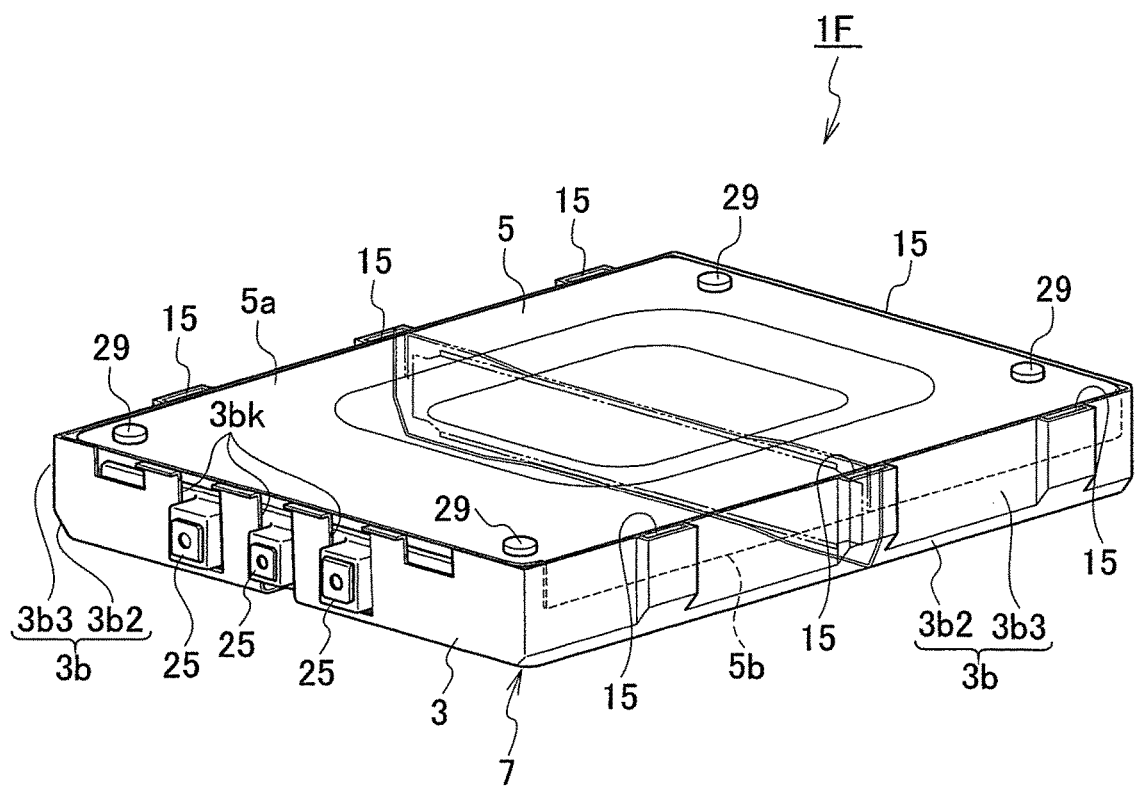
FIG. 13 is a perspective view illustrating a battery module with communicating portions partially formed.

As described in FIGS. 3 and 5, in the above-described embodiments, the communicating portions 15 are formed at the respective regions corresponding to three sides around the rectangular case 7. However, the battery module may be properly changed so as to include one of the communicating portions 15 in only one side, for example. In the above-described embodiment, each communicating portion 15 is continuously provided for one of the four sides of the rectangular case 7. However, like a battery module 1F illustrated in FIG. 13, for example, the communicating portions 15 may be partially provided for each side of the rectangular case 7. In the case of FIG. 13, three partial communicating portions 15 are formed, but the number thereof is not limited. Moreover, the case 7 accommodates plural unit cells 13 but may be configured to accommodate one unit cell 13.

With the battery pack according to the present invention, even when a battery within one of battery modules generates high-temperature gas due to abnormalities in the battery, heat of the high-temperature gas is prevented from influencing a battery within another battery module.

The invention claimed is:

1. A battery pack, comprising:
a plurality of battery modules, wherein:
each of the plurality of battery modules includes a battery and a case accommodating the battery,
the case includes a lower case covering a lower part of the battery within the case and an upper case covering an upper part of the battery,
between the lower and upper cases, an accommodation space accommodating the battery is formed,
the lower case includes a bottom wall portion situated under the battery and a sidewall portion extending upward from an outer limit of the bottom wall portion,
the upper case includes a top wall portion situated over the battery and a sidewall portion extending downward from an outer limit of the top wall portion,
the plurality of battery modules are stacked on top of each other with the upper case of each facing up and the lower case of each facing down, such that the top wall portion of the upper case of a lower battery module and the bottom wall portion of the lower case of an upper battery module face each other,
the sidewall portion of the upper case is positioned on one side of the accommodation space, and the sidewall portion of the lower case is situated on an opposite side of the sidewall portion of the upper case from the one side of the accommodation space and is spaced from the sidewall portion of the upper case,
an upper end of the sidewall portion of the lower case is situated above a lower end of the sidewall portion of the upper case, and
between the sidewall portions of the lower and upper cases, a communicating portion is provided, wherein the communicating portion is a passage, which enables communication between the accommodation space and an outside of the case and discharges, when the battery generates gas, high temperature gas from within the case to the outside of the case.

2. The battery pack according to claim 1, wherein the sidewall portion of the lower case is inclined so that an upper part thereof is situated farther outward from the accommodation space than a lower part thereof.

3. The battery pack according to claim 1, wherein an inner surface of the sidewall portion of the lower case is concave upward.

4. The battery pack according to claim 1, wherein the battery is composed of a plurality of unit cells, and
    each unit cell is a laminate cell which includes a power generating element and an electrolyte accommodated within a bag-shaped package,
    the power generating element including a positive plate, a negative plate, and a separator which are stacked on top of each other.

* * * * *